US011251736B2

(12) United States Patent
Vogelsberger et al.

(10) Patent No.: US 11,251,736 B2
(45) Date of Patent: Feb. 15, 2022

(54) ELECTRIC DRIVE SYSTEM AND METHOD FOR OPERATING A POWER CONVERTER

(71) Applicant: Bombardier Transportation GmbH, Berlin (DE)

(72) Inventors: Markus Vogelsberger, Trins (AT); Christian Wirth, Winterthur (CH)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 17/032,168

(22) Filed: Sep. 25, 2020

(65) Prior Publication Data

US 2021/0126569 A1   Apr. 29, 2021

(30) Foreign Application Priority Data

Sep. 26, 2019   (DE) ...................... 10 2019 214 719.4

(51) Int. Cl.
*H02M 7/5387* (2007.01)
*H02P 27/06* (2006.01)
*B60L 50/51* (2019.01)
*B61C 3/00* (2006.01)

(52) U.S. Cl.
CPC .............. *H02P 27/06* (2013.01); *B60L 50/51* (2019.02); *B61C 3/00* (2013.01); *B60L 2210/40* (2013.01)

(58) Field of Classification Search
CPC .. H02P 27/06; H02P 6/08; B60L 50/51; B60L 2210/40; B61C 3/00
See application file for complete search history.

(56) References Cited

U.S. PATENT DOCUMENTS

| 2013/0063067 A1* | 3/2013 | Tanaka .................... H01L 25/07 318/494 |
| 2013/0169035 A1 | 7/2013 | Nakashima |
| 2013/0176014 A1* | 7/2013 | Guan .................. H02M 7/4837 323/311 |

* cited by examiner

*Primary Examiner* — Muhammad S Islam
(74) *Attorney, Agent, or Firm* — The Webb Law Firm

(57) ABSTRACT

A power converter, an electric drive system and a method for operating a power converter are disclosed. The power converter has connections for connecting to a direct voltage source and connections for electrical connection to phase lines of the electric drive machine. The power converter is configured to convert a direct voltage from the direct voltage source via a direct voltage intermediate circuit into an alternating voltage in order to drive the drive machine. The power converter includes bridge branches for connecting a high-potential section to a low-potential section. A bridge branch includes two half branches with at least one switching device. A resulting nominal voltage of a half branch is greater than a counter-electromotive peak voltage between two phase lines at the maximum rotational speed of the drive machine. A half branch of a bridge branch includes a series circuit of two or more than two switching devices.

20 Claims, 2 Drawing Sheets

ELECTRIC DRIVE SYSTEM AND METHOD FOR OPERATING A POWER CONVERTER

CROSS-REFERENCE TO RELATED APPLICATION

This application claims priority to German Application No. 10 2019 214 719.4 filed Sep. 26, 2019, the disclosure of which is hereby incorporated in its entirety by reference.

BACKGROUND OF THE INVENTION

Field of the Invention

The invention relates to an electric drive system and a method for operating a power converter.

Description of the Related Art

Electric drive systems with a permanent magnet machine and a power converter are known to the person skilled in the art. A power converter may comprise a plurality of silicon carbide switching devices, wherein the switching devices must usually have a nominal voltage which is greater than a counter-electromotive peak voltage (EMF) between two phase lines of the drive machine at the maximum rotational speed of the drive machine.

Counter-electromotive voltages between phase lines may then occur, in particular when a change is carried out from a motor operation into a generating operation of the drive machine. This may be the case, e.g., when a target speed or a target torque is reduced during operation of the drive machine, for example, because a vehicle operator of a rail vehicle would like to reduce a speed of the rail vehicle. Such a scenario may also occur when, during a constant speed of the rail vehicle, the incline of the track decreases, e.g., because a highest point of a mountain has been passed. Counter-electromotive voltages are thus generated by the drive machine and drop off at least between two phase lines.

One advantageous configuration of the switching devices increases operational safety, as it may hereby be ensured that the switching devices may not be damaged by counter-electromotive voltages that are too high. It is disadvantageous, however, that the described configuration generally contributes to high costs. Corresponding switching devices are also generally custom-made products, as they are not normally available for high counter-electromotive voltages.

The technical problem therefore arises of creating an electric drive system and a method for operating a power converter which on the one hand ensures a desired operational safety and reduces production costs. Furthermore, the technical problem arises of creating an improved operation of an electric machine with a power converter.

SUMMARY OF THE INVENTION

An electric drive system is proposed, in particular for a rail vehicle, wherein the electric drive system comprises a power converter and an electric drive machine. The electric drive machine is connected to the power converter.

The electric drive machine is a permanently-excited drive machine. The electric drive machine is preferably a permanently-excited synchronous machine.

The power converter has connections for connecting to a direct voltage source, for example, a traction battery, or to an external electrical supply network, in particular a high-potential direct voltage connection for a high-potential section and a low-potential direct voltage connection for a low-potential section of the power converter. A high potential is hereby a direct voltage potential which is higher than the low potential. The low potential ss also a direct voltage potential.

Furthermore, the power converter has connections for electrical connection to phase lines of the electric drive machine, in particular connections for three phase lines. The phase lines function for guiding an alternating current.

Furthermore, the power converter is configured to convert a direct voltage from the direct voltage source via direct voltage intermediate circuit into an alternating voltage in order to drive the drive machine. The direct voltage intermediate circuit may hereby comprise at least one capacitive element, which is arranged between the high-potential section and the low-potential section, the high-potential section has the high potential and the low-potential section has the low potential.

Furthermore, the power converter has bridge branches for connecting the high-potential section to the low-potential section. A bridge branch may hereby be arranged electrically parallel to the direct voltage intermediate circuit of the power converter.

Furthermore, a bridge branch comprises two half branches, each having at least one switching device. A first half branch hereby functions for electrical connection between the high-potential section and the connection for a phase line to the bridge branch. A second half branch functions for electrical connection between the low-potential section and the connection for the phase line to the bridge branch. The half branches are switched in series in the bridge branch. The connection for the phase line is arranged in a connection section of the two half branches or is connected to this connection section.

The switching device may hereby be an electronic switching device. This may, in particular, comprise a switching element, e.g., a switch element designed as a MOSFET or as an IGBT. Furthermore, the switching device may comprise a freewheeling diode. This may be switched electrically parallel to the switching element. A switching element may hereby assume a closed or an open state. These states may be set by controlling the switching element, in particular by applying a corresponding gate voltage.

Furthermore, a resulting nominal voltage of a half branch is greater than a counter-electromotive peak voltage (EMF) between two phase lines of the drive machine at the maximum rotational speed of the rotor of the drive machine. The resulting nominal voltage of a half branch may be provided as a function of the number of switching devices and their electrical arrangement in a half branch. If a half branch comprises precisely one switching device, then the resulting nominal voltage corresponds to the nominal voltage of this one switching device. If a half branch comprises multiple switching devices connected in series, then the resulting nominal voltage corresponds to the sum of the nominal voltages of these switching devices.

According to the invention, a half branch of a bridge branch comprises a series circuit of two or more than two switching devices.

A first half branch of a bridge branch may be arranged, in particular, between the high-potential section and the connection for the phase line to this bridge branch. This half branch may comprise a number m of switching devices switched in series. A count direction for ordinal numbers of the switching devices in the first half branch may hereby be oriented from the high-potential section to the connection for the phase line. The second half branch may be arranged between the low-potential section and the connection for the phase line. The second half branch of the bridge branch may correspondingly comprise a number k of switching devices switched in series. The number m of switching devices in the first half branch is preferably equal to the number k of switching devices in the second half branch. A count direction for ordinal numbers of the switching devices in the second half branch may hereby be oriented from the low-potential section to the connection for the phase line.

Due to the design of a half branch as a series circuit having at least two switching devices, there arises in an advantageous way that the nominal voltage of a single switching device may be lower than the aforementioned counter-electromotive peak voltage. This, in turn, reduces production costs for such a switching device and may increase the availability of such switching devices.

In another embodiment, the power converter is designed as an n-level inverter, wherein n is greater than 2. This may mean that, during an operation of the switching devices in a bridge branch, thus the setting of opened and closed states of the switching devices, n different voltage levels may be provided at the connection for the phase line of the bridge branch.

The design of a half branch as a series circuit of multiple switching devices advantageously facilitates, in particular through suitable interconnection of the switching devices, that more than two voltage levels may be provided at the aforementioned connection due to suitable operation. By this means, in turn, an operation of an electric machine connected to the power converter may be improved. This arises in particular from the fact that a voltage curve may be generated by the power converter, which in turn leads to the fact that a phase current may be better adapted to a sine wave. By this means, in turn, a current ripple, and thus also a torque ripple, may be reduced during operation of the drive machine.

In one preferred embodiment, the power converter is designed as a three-level inverter. In this case, either a potential of the high-potential section, a potential of the low-potential section, or an intermediate potential may be provided at the connection for the phase line by setting the switching states of switching devices in the bridge branch. The intermediate potential is hereby lower than the high potential, yet higher than the low potential. The intermediate potential preferably corresponds to the average potential between the high and the low potentials.

In this case, a half branch may comprise a series circuit of precisely two switching devices. By this means, a good compromise advantageously results between an improvement of the operation of the electric drive machine and the production costs of the power converter.

In another embodiment, the series circuit of a half branch comprises three switching devices. By this means, a good compromise advantageously results between an improvement of the operation of the electric drive machine and the number of switching devices in a half branch necessary for this purpose, and thus with the production costs of the power converter, as such a series circuit particularly facilitates the design of both a three-level and also a five-level power converter.

In another embodiment, the direct voltage intermediate circuit comprises a series circuit of two capacitive elements. A capacitive element may be designed in particular as a capacitor. By this means, a simple and reliable provision of an intermediate potential advantageously arises, which may be provided, in particular, in a capacitor connection section, wherein a capacitor connection section connects two capacitive elements of the series circuit. Such an intermediate potential in turn facilitates as is subsequently explained in greater detail the simple provision of a three- or five-level power converter.

In another embodiment, the at least one aforementioned capacitor connection section of the direct voltage intermediate circuit is electrically connected both to a switching device connection section in the first half branch and also in the second half branch. A switching device connection section hereby connects two switching devices of a half branch.

In another embodiment, a capacitor connection section is connected to a switching device connection section in the first half branch, which connects two switching devices having sequential ordinal numbers, wherein the capacitor connection section is also connected to a switching device connection section in the second half branch, which connects two switching devices having the same ordinal numbers. The counting direction of the ordinal numbers was already previously explained. In other words, the number of switching devices switched in series, via which the switching device connection section in one half branch is connectable to the connection for the phase line, may be the same in both half branches.

By this means, a simple structure of a multi-level power converter advantageously arises, which may provide voltage levels equally distributed between the high potential and the low potential.

In another embodiment, the electrical connection comprises at least one diode and/or at least one connection switching device. A forward direction of the diode in the electrical connection of the capacitor connection section and of a switching device connection section in the first half branch may hereby be oriented from the capacitor connection section to the switching device connection section. A forward direction of the diode in the electrical connection of the capacitor connection section and of a switching device connection section in the second half branch may hereby be oriented from the switching device connection section to the capacitor connection section.

A connection switching device may be a parallel circuit of a switching element and a freewheeling diode. A forward direction of the freewheeling diode in the electrical connection of the capacitor connection section and of a switching device connection section in the first half branch may hereby be oriented from the capacitor connection section to the switching device connection section. A forward direction of the freewheeling diode in the electrical connection of the capacitor connection section and of a switching device connection section in the second half branch may hereby be oriented from the switching device connection section to the capacitor connection section.

By this means, an increased operational safety of the power converter advantageously arises, as undesired current flows are prevented by the diodes.

In another embodiment, the sum of the nominal voltages of the switching devices in one half branch is greater than a counter-electromotive peak voltage between two phase lines of the drive machine at the maximum rotational speed of the rotor of the drive machine. Thus, the resulting nominal voltage is thus higher than the counter-electromotive peak voltage, which was previously already explained. In particular, the nominal voltage of a single switching device may hereby be lower than the counter-electromotive peak voltage.

It is possible that the nominal voltages of all switching devices in one half branch are the same. However, it is also possible that these differ from one another.

It is also conceivable that the sum of the nominal voltages of the switching devices in one half branch is less than or equal to the counter-electromotive peak voltage between two phase lines of the drive machine at the maximum rotational speed of the rotor of the drive machine, in particular when it is ensured by suitable measures that the electric machine is not operated in generating operation.

By this means, an inexpensive and operationally safe design of the power converter advantageously arises.

In another embodiment, a switching element of a switching device, in particular of a switching device in a bridge branch or in a connection switching device, is designed as a silicon carbide switching element. Alternatively, the switching element is designed as a gallium arsenide switching element. Additionally alternatively, the switching element is designed as a gallium nitride switching element. Additionally alternatively, the switching element is designed as a diamond switching element or as an aluminum nitride switching element. By this means, an improved adaption to demands for dielectric strength and/or power loss advantageously arises, by which means in turn an increased operational reliability may be ensured.

In another embodiment, a freewheeling diode of a switching device, in particular of a switching device in a bridge branch or in a connection switching device, is designed as a silicon carbide diode. Alternatively, the freewheeling diode is designed as a gallium arsenide diode. Additionally alternatively, the freewheeling diode is designed as a gallium nitride diode. Additionally alternatively, the freewheeling diode is designed as a diamond diode or as an aluminum nitride diode. By this means, an improved adaption to demands for dielectric strength and/or power loss likewise advantageously arises, by which means in turn an increased operational reliability may be ensured.

The switching element and the freewheeling diode of a switching device are preferably of the same type.

An electric drive system is additionally proposed, in particular for a rail vehicle, wherein the electric drive system comprises a power converter and an electric drive machine. The electric drive machine is connected to the power converter.

The electric drive machine is a permanently-excited drive machine. The electric drive machine is preferably a permanently-excited synchronous machine.

The power converter has connections for connecting to a direct voltage source and connections for electrically connecting to phase lines of the electric drive machine, wherein the power converter is configured to convert a direct voltage from the direct voltage source via a direct voltage intermediate circuit into an alternating voltage in order to drive the drive machine, wherein the power converter comprises bridge branches for connecting a high-potential section to a low-potential section, wherein a bridge branch comprises two half branches with at least one switching device in each case, wherein a resulting nominal voltage of a half branch is greater than a counter-electromotive peak voltage between two phase lines of the drive machine at the maximum rotational speed of the drive machine, wherein one half branch of a bridge branch comprises precisely one switching device. The phase lines function for guiding an alternating current.

Furthermore, a switching element of the switching device is designed as a gallium arsenide switching element, or a gallium nitride switching element, or a diamond switching element, or an aluminum nitride switching element.

It is furthermore possible that a freewheeling diode of a switching device, in particular a switching device in a bridge branch or in a connection switching device, is designed as a gallium arsenide diode, or a gallium nitride diode, or a diamond diode, or an aluminum nitride diode. The switching element and the freewheeling diode of the switching device are preferably of the same type.

Due to the materials of the switching element, in comparison to a switching element designed as a silicon carbide switching element, a higher dielectric strength of the switching element advantageously results at otherwise comparable requirements, in particular installation space requirements.

According to one of the embodiments of the power converter explained in this disclosure, the power converter may hereby be further developed with a series circuit of two or more than two switching devices in one half branch.

The electric drive machine of such a drive system may be, in particular, a permanently-excited synchronous machine.

Furthermore, the electric drive system or the power converter may comprise a control device, which may be designed, e.g., as a microcontroller or as an integrated circuit, or may comprise the same. The control device may control an operation of the power converter, in particular the setting of switching states of the switching devices of the power converter, and thus also an operation of the electric drive machine.

Furthermore, a method is proposed for operating a power converter according to one of the embodiments explained in this disclosure. The method may also hereby function for operating an electric drive machine. Switching times of the switching devices are hereby set as a function of a desired temporal course of a voltage and/or of a phase current, which is provided by the power converter to the connections for electrical connection of the power converter to phase lines of an electric drive machine.

In particular, different voltage levels of this voltage may hereby be set, in particular more than two voltage levels.

The switching times may be set, in particular, by a control device.

The advantages of the proposed method have already been previously explained.

BRIEF DESCRIPTION OF THE DRAWINGS

The invention is explained in greater detail by way of exemplary embodiments. The figures show in.

Identical reference numerals subsequently indicate elements with the same or similar technical features.

DETAILED DESCRIPTION OF THE PREFERRED EMBODIMENTS

Figure 1:
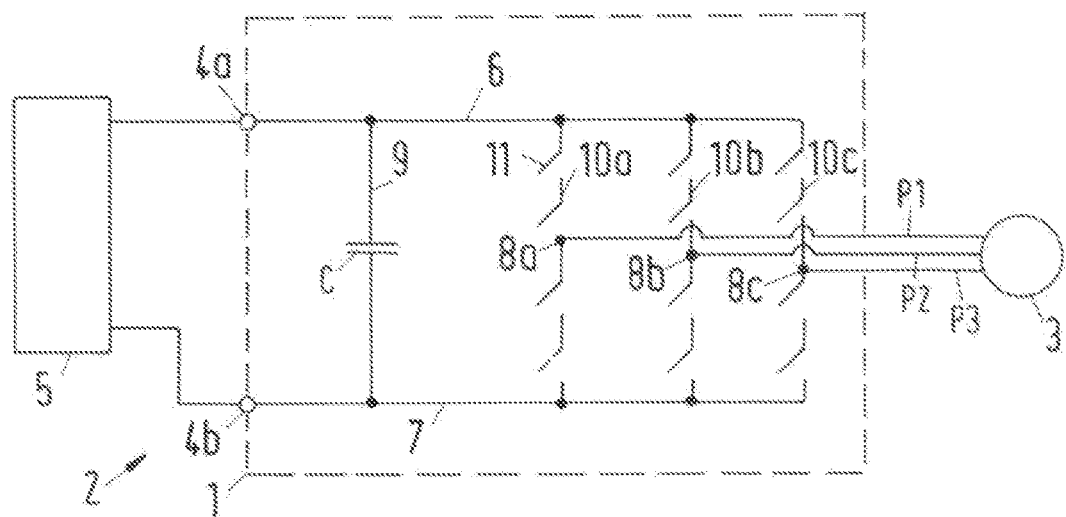
FIG. 1 a schematic circuit diagram of a power converter for use in a drive system according to the invention, FIG. 2 a schematic circuit diagram of a bridge branch of a power converter for use in a drive system according to the invention, FIG. 3 a schematic circuit diagram of a power converter for use in a drive system according to the invention in another embodiment, FIG. 4 a schematic depiction of an output voltage of the power converter, FIG. 5 a schematic circuit diagram of a power converter for use in a drive system according to the invention in another embodiment, and FIG. 6 a schematic circuit diagram of a power converter for use in a drive system according to the invention in another embodiment.

FIG. 1 shows a schematic circuit diagram of a power converter 1, which is part of an electric drive system 2 according to the invention. Drive system 2 comprises an electric drive machine 3 in addition to power converter 1. The drive machine is a permanent-magnet drive machine, in particular a permanently-excited synchronous machine. Drive system 2 may, in particular, be a drive system of a rail vehicle.

Power converter 1 has connections 4a, 4b for connecting to a direct voltage source 5. A high potential connection 4a hereby functions for connecting a high-potential section 6 of power converter 1 to a high potential of direct voltage source 5, and a low-potential connection 4b functions for connecting a low-potential section 7 of power converter 1 to a low potential of direct voltage source 5.

Furthermore, power converter 1 comprises connections 8a, 8b, 8c for electrical connection to phase lines P1, P2, P3 of electric drive machine 3. A first connection 8a is hereby connected to a first phase line P1, a second connection 8b is connected to a second phase line P2, and a third connection 8c is connected to a third phase line P3.

Power converter 1 is configured to convert a direct voltage from direct voltage source 5 via a direct voltage intermediate circuit 9 into an alternating voltage in order to drive the drive machine 3. Direct voltage intermediate circuit 9 comprises an intermediate capacitor C, via which the high- and low-potential sections 6, 7 are connected. Furthermore, power converter 1 comprises three bridge branches 10a, 10b, 10c for connecting high-potential section 6 to low-potential section 7, wherein a bridge branch 10a, 10b, 10c comprises two half branches HZ1, HZ2 (see FIG. 2) with at least one switching device 11 in each case. For reasons of clarity, only one switching device 11 is provided with a reference numeral in FIG. 1.

It is furthermore depicted that a half branch HZ1, HZ2 of a bridge branch 10a, 10b, 10c comprises a series circuit of at least two switching devices 11.

Switching devices 11 in a bridge branch 10a, 10b, 10c are hereby designed in such a way that a resulting nominal voltage of a half branch HZ1, HZ2 is greater than a counter-electromotive peak voltage between two phase lines P1, P2, P3 of drive machine 3 at the maximum rotational speed of the rotor of drive machine 3.

Figure 2:
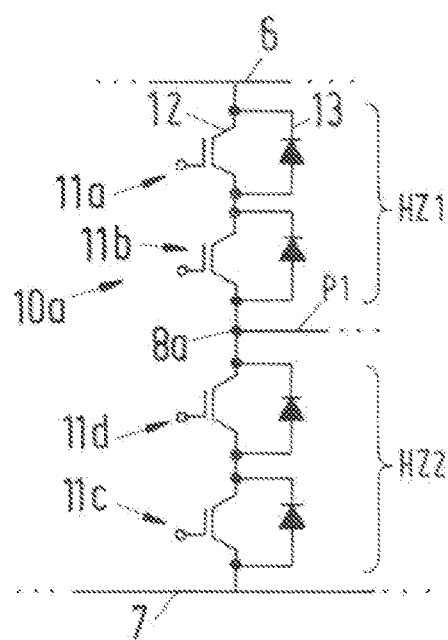

FIG. 2 shows schematic circuit diagram of a first bridge branch 10a of a power converter 1 for use in a drive system 2 according to the invention. It is clear that a switching device 11 is formed by a parallel circuit made from a switching element 12, which is designed, e.g., as a MOSFET or an IGBT, and a freewheeling diode 13. For reasons of clarity, only one switching element 12 and one freewheeling diode 13 are provided with a reference numeral.

It is further depicted that a first half branch HZ1, which connects high-potential section 8 to connection 8a for first phase line P1, comprises a series circuit of a first switching device 11a and another switching device 11b of first half branch HZ1. A second half branch HZ2, which connects low-potential section 7 to connection 8a for first phase line P1, comprises a series circuit of a first switching device 11c and another switching device 11d of second half branch HZ2.

Switching devices 11a, 11b or 11c, 11d may hereby be designed in such a way that the sum of the nominal voltages of switching devices 11a, 11b or 11c, 11d in a half branch HZ1, HZ2 is higher than an already explained counter-electromotive peak voltage between two phase lines P1, P2, P3. In particular, the nominal voltage of a single switching device 11a, 11b, 11c, 11d may hereby be lower than the counter-electromotive peak voltage.

Figure 3:
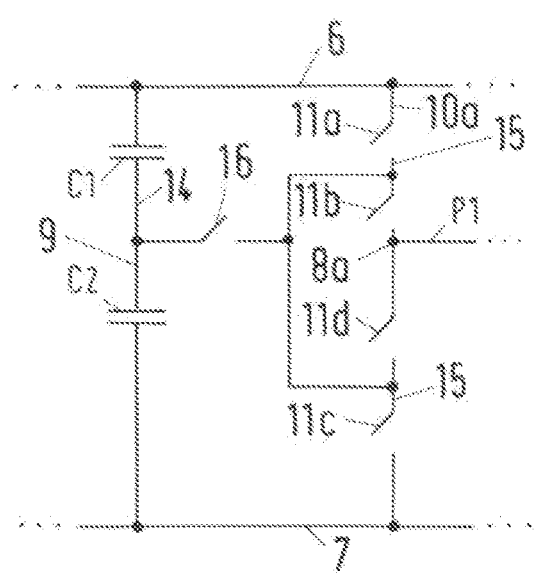

FIG. 3 shows a schematic circuit diagram of a power converter 1, wherein high-potential section 6, low-potential section 7, direct voltage intermediate circuit 9, and first bridge branch 10a are depicted. Power converter 1 depicted in FIG. 3 is designed as a three-level inverter.

For this purpose, the series circuit of switching devices 11a, 11b, or 11c, 11d per half branch HZ1, HZ2 comprises two switching devices 11a, 11b or 11c 11d. Furthermore, direct voltage intermediate circuit (9) comprises a series circuit of two capacitors C1, C2.

A capacitor connection section 14, which connects both capacitors C1, C2 in direct voltage intermediate circuit 9, is electrically connected both to a switching device connection section 15 for connecting first switching device 11a to second switching device 11b of first half branch HZ1 and also to a connection section 15 for connecting first switching device 11c to second switching device 11d of second half branch HZ2. It is depicted that this connection is carried out via a connection switching device 16.

Figure 4:
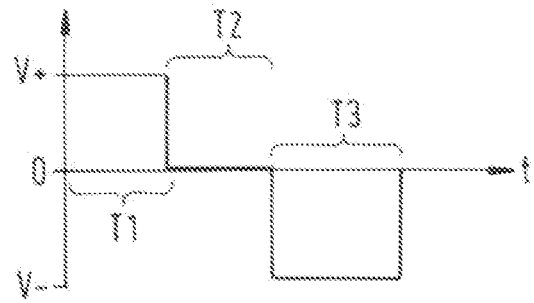

Due to this type of design of power converter 1, it is facilitated that the voltage levels depicted in FIG. 4 may be set. FIG. 4 shows a schematic temporal course of voltage levels, which may be set at connection 8a for first phase line P1 of first bridge branch 10a. In a first time window T1, a first voltage level is set which corresponds to high potential V+. For this purpose, switching devices 11a, 11b of first half branch HZ1 are closed, while switching devices 11c, 11d of second half branch HZ2 are open. In a second time window T2, a second voltage level is set, which corresponds to an average potential between the high and the low potential. It is depicted in FIG. 4 that the average potential is a null potential.

For this purpose, first switching device 11a of first half branch HZ1 is open, while second switching device 11b of first half branch HZ1 is closed. Switching devices 11c, 11d of second half branch HZ2 are likewise open. These switching states are then set, in particular when a current flow is and/or supposed to be directed from capacitor connection section 14 to connection 8a. The second voltage level may also be set in that first switching device 11c of second half branch HZ2 is open, while second switching device 11d of second half branch HZ2 is closed. Switching devices 11a, 11b of first half branch HZ1 are open. These switching states are then set, in particular when a current flow is and/or supposed to be directed from connection 8a to capacitor connection section 14.

In a third time window T3, a third voltage level is set which corresponds to low potential V−. For this purpose, switching devices 11a, 11b of first half branch HZ1 are open, while switching devices 11c, 11d of second half branch HZ2 are closed.

Figure 5:
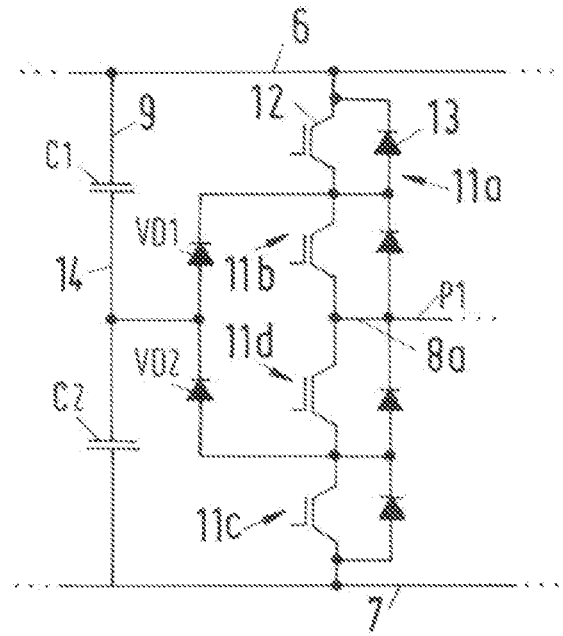

FIG. 5 shows a schematic circuit diagram of a power converter 1 for use in a drive system 2 according to the invention, wherein high-potential section 6, low-potential section 7, direct voltage intermediate circuit 9, and first bridge branch 10a are depicted.

Power converter 1 depicted in FIG. 5 hereby corresponds to power converter 1 depicted in FIG. 3, wherein switching devices 11a, 11b, 11c, 11d are depicted as the parallel circuit of a switching element 12 and a freewheeling diode 13.

Unlike the embodiment depicted in FIG. 3, the electrical connection of capacitor connection section 14 to switching device connection section 15t for connecting first switching device 11a to second switching device 11b of first half branch HZ1 is carried out via a first junction diode VD1, wherein a forward direction of said junction diode VD1 is oriented from capacitor connection section 14 to switching device connection section 15.

It is further depicted, that the electrical connection of capacitor connection section 14 to switching device connection section 15 for connecting first switching device 11c to second switching device 11d of second half branch HZ2 is carried out via a further junction diode VD2, wherein a forward direction of said further junction diode VD2 is oriented from switching device connection section 15 to capacitor connection section 14.

Figure 6:
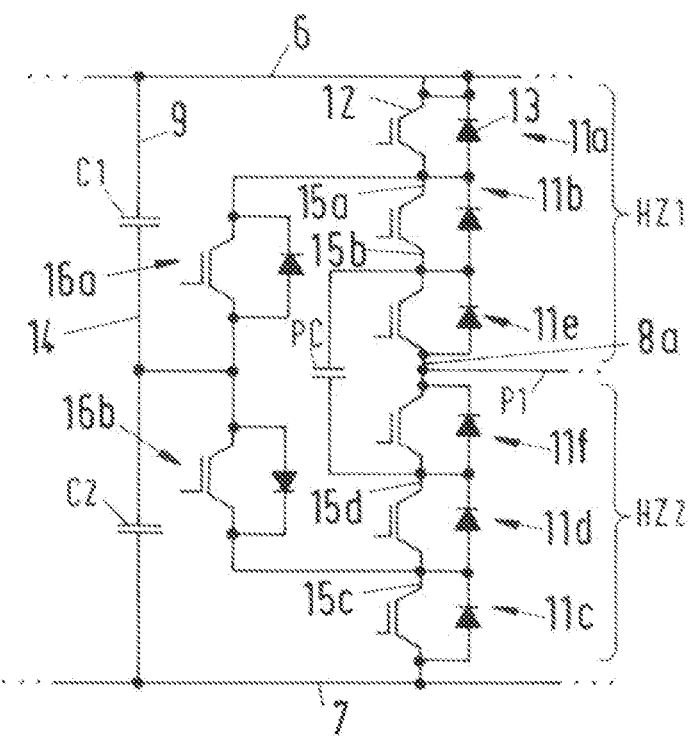

FIG. 6 shows a schematic circuit diagram of a power converter 1 for use in a drive system 2 according to the invention, wherein high-potential section 6, low-potential section 7, direct voltage intermediate circuit 9, and first bridge branch 10a are depicted. Power converter 1 depicted in FIG. 6 is designed as a five-level power converter.

It is depicted that, in a first half branch HZ1 of the first bridge branch, three switching devices 11a, 11b, 11e are switched in series, wherein these switching devices are in turn designed as a parallel circuit of a switching element 12 and a freewheeling diode 13. Correspondingly, second half branch HZ2 of the second bridge branch likewise comprises three switching devices 11c, 11d, 11f, designed in such way, which are likewise switched in series.

It is further depicted that direct voltage intermediate circuit 9 comprises a series circuit of two capacitors C1, C2, wherein a capacitor connection section 14, which connects both capacitors C1, C2 in direct voltage intermediate circuit 9, is electrically connected both to a first switching device connection section 15a for connecting first switching device 11a to second switching device 11b of first half branch HZ1 and also to a first connection section 15c for connecting first switching device 11c to second switching device 11d of second half branch HZ2. Capacitor connection section 14 is furthermore electrically connected both to a second switching device connection section 15b for connecting second switching device 11b to third switching device 11e of first half branch HZ1 and also to a second connection section 15d for connecting second switching device 11d to third switching device 11f of second half branch HZ2.

It is further depicted, that the electrical connection of capacitor connection section 14 to first switching device connection section 15a of first half branch HZ1 is carried out via a first connection switching device 16a, wherein said connection switching device 16a is designed as a parallel circuit of a switching element 12 and a freewheeling diode 13, wherein the forward direction of freewheeling diode 13 is oriented from capacitor connection section 14 to first switching device connection section 15a.

It is further depicted, that the electrical connection of capacitor connection section 14 to first switching device connection section 15c of second half branch HZ2 is carried out via a further connection switching device 16b, which is likewise designed as a parallel circuit of a switching element 12 and a freewheeling diode 13, wherein the forward direction of freewheeling diode 13 is oriented from switching device connection section 15c to capacitor connection section 14.

A phase capacitor PC is furthermore depicted, via which second switching device connection section 15b of first half branch HZ1 is connected to second switching device connection section 15d of second half branch HZ2.

Due to suitable setting of the switching states of switching elements 12 of switching devices 11a, . . . , 11f, 16a, 16b, five different levels of the phase voltage may be set.

The invention claimed is:

1. An electric drive system for a rail vehicle comprising:
a power converter; and
an electric drive machine which is connected to the power converter,
wherein the electric drive machine is a permanently-excited drive machine,
wherein the power converter has connections for connecting to a direct voltage source and connections for electrical connection to phase lines of the electric drive machine, wherein the power converter is configured to convert a direct voltage from the direct voltage source via a direct voltage intermediate circuit into an alternating voltage in order to drive the electric drive machine,
wherein the power converter comprises at least one bridge branch for connecting a high-potential section to a low-potential section,
wherein the at least one bridge branch comprises two half branches with at least one switching device in each case,
wherein a resulting nominal voltage of at least one half branch is greater than a counter-electromotive peak voltage between two phase lines of the electric drive machine at a maximum rotational speed of a rotor of the electric drive machine, and
wherein at least one half branch of the bridge branch comprises a series circuit of at least two switching devices.

2. The drive system according to claim 1, wherein the power converter is designed as an n-level inverter, wherein n is greater than two.

3. The drive system according to claim 2, wherein the power converter is designed as a three-level inverter.

4. The drive system according to claim 2, wherein the series circuit of at least one half branch comprises three switching devices.

5. The drive system according to claim 2, wherein a direct voltage intermediate circuit comprises a series circuit of at least two capacitive elements.

6. The drive system according to claim 4, wherein a direct voltage intermediate circuit comprises a series circuit of at least two capacitive elements.

7. The drive system according to claim 5, wherein at least one capacitor connection section for connecting two capacitive elements of the series circuit in the direct voltage intermediate circuit is electrically connected in each case to a switching device connection section for connecting two switching devices of the half branch.

8. The drive system according to claim 6, wherein at least one capacitor connection section for connecting two capacitive elements of the series circuit in the direct voltage intermediate circuit is electrically connected in each case to a switching device connection section for connecting two switching devices of the half branch.

9. The drive system according to claim 7, wherein the at least one capacitor connection section is connected to a first switching device connection section in a first of the two half branches which connects two switching devices having two sequential ordinal numbers, and wherein the at least one capacitor connection section is also connected to a second switching device connection section in a second of the two half branches which connects two switching devices having same ordinal numbers.

10. The drive system according to claim 8, wherein the at least one capacitor connection section is connected to a first switching device connection section in a first of the two half branches which connects two switching devices having two sequential ordinal numbers, and wherein the at least one capacitor connection section is also connected to a second switching device connection section in a second of the two half branches which connects two switching devices having same ordinal numbers.

11. The drive system according to claim 7, wherein the electrical connection comprises at least one diode and/or at least one connection switching device.

12. The drive system according to claim 8, wherein the electrical connection comprises at least one diode and/or at least one connection switching device.

13. The drive system according to claim 1, wherein the sum of the nominal voltages of the at least one switching device in one half branch is higher than a counter-electromotive peak voltage between two phase lines of the electric drive machine at the maximum rotational speed of the rotor of the electric drive machine.

14. The drive system according to claim 1, wherein a switching element of the at least one switching device is designed as a silicon carbide switching element, or a gallium arsenide switching element, or as a gallium nitride switching element, or as a diamond switching element, or as an aluminum nitride switching element.

15. The drive system according to claim 13, wherein a switching element of the at least one switching device is designed as a silicon carbide switching element, or a gallium arsenide switching element, or as a gallium nitride switching element, or as a diamond switching element, or as an aluminum nitride switching element.

16. The drive system according to claim 1, wherein a freewheeling diode of the at least one switching device is designed as a silicon carbide diode, or a gallium arsenide diode, or as a gallium nitride diode, or as a diamond diode, or as an aluminum nitride diode.

17. The drive system according to claim 13, wherein a freewheeling diode of the at least one switching device is designed as a silicon carbide diode, or a gallium arsenide diode, or as a gallium nitride diode, or as a diamond diode, or as an aluminum nitride diode.

18. An electric drive system for a rail vehicle comprising:
a power converter; and
an electric drive machine which is connected to the power converter,
wherein the electric drive machine is a permanently-excited drive machine,
wherein the power converter has connections for connecting to a direct voltage source and connections for electrical connection to phase lines of the electric drive machine,
wherein the power converter is configured to convert a direct voltage from the direct voltage source via a direct voltage intermediate circuit into an alternating voltage in order to drive the electric drive machine,
wherein the power converter comprises at least one bridge branch for connecting a high-potential section to a low-potential section,
wherein the at least one bridge branch comprises two half branches with at least one switching device in each case,
wherein a resulting nominal voltage of at least one half branch is greater than a counter-electromotive peak voltage between two phase lines of the electric drive machine at a maximum rotational speed of a rotor of the electric drive machine,
wherein at least one half branch of the at least one bridge branch comprises precisely one switching device, and wherein a switching element of the switching device is designed as a gallium arsenide switching element, or as a gallium nitride switching element, or as a diamond switching element, or as an aluminum nitride switching element.

19. The electric drive system according to claim 18, wherein the permanently-excited drive machine is a permanently-excited synchronous machine.

20. A method for operating a drive system according to claim 1, wherein switching times of the at least one switching device may be set as a function of a desired temporal course of a current, which is provided the by power converter at connections for electrical connection to the phase lines of the electric drive machine.

* * * * *

UNITED STATES PATENT AND TRADEMARK OFFICE
CERTIFICATE OF CORRECTION

PATENT NO. : 11,251,736 B2
APPLICATION NO. : 17/032168
DATED : February 15, 2022
INVENTOR(S) : Markus Vogelsberger et al.

Page 1 of 1

It is certified that error appears in the above-identified patent and that said Letters Patent is hereby corrected as shown below:

In the Claims

Column 12, Line 41, Claim 20, delete "the by" and insert -- by the --

Signed and Sealed this
Twenty-first Day of June, 2022

Katherine Kelly Vidal
*Director of the United States Patent and Trademark Office*